(12) United States Patent
Beauchamp et al.

(10) Patent No.: US 11,061,609 B2
(45) Date of Patent: Jul. 13, 2021

(54) DISTRIBUTED MEMORY OBJECT METHOD AND SYSTEM ENABLING MEMORY-SPEED DATA ACCESS IN A DISTRIBUTED ENVIRONMENT

(71) Applicant: MemVerge, Inc, Milpitas, CA (US)

(72) Inventors: Robert Beauchamp, Berlin, MA (US); Chenggong Fan, Saratoga, CA (US); Xin Li, Fremont, CA (US); Yue Li, Fremont, CA (US); Srinivas Aji, Bangalore (IN)

( * ) Notice: Subject to any disclaimer, the term of this patent is extended or adjusted under 35 U.S.C. 154(b) by 66 days.

(21) Appl. No.: 16/255,414

(22) Filed: Jan. 23, 2019

(65) Prior Publication Data
US 2020/0042239 A1    Feb. 6, 2020

Related U.S. Application Data (60) Provisional application No. 62/713,537, filed on Aug. 2, 2018.

(51) Int. Cl.
*G06F 3/06* (2006.01)
*G06F 11/20* (2006.01)

(52) U.S. Cl.
CPC .......... *G06F 3/0659* (2013.01); *G06F 3/0604* (2013.01); *G06F 3/065* (2013.01);
(Continued)

(58) Field of Classification Search
CPC ............... G06F 12/084; G06F 12/0223; G06F 2212/656; G06F 12/109; G06F 2212/154;
(Continued)

(56) References Cited

U.S. PATENT DOCUMENTS

| 5,787,247 A | 7/1998 | Norin et al. |
| 7,162,476 B1 | 1/2007 | Belair et al. |

(Continued)

OTHER PUBLICATIONS

Ma et al. "An Efficient Framework for Implementing Persist Data Structures on Remote NVM," Sep. 2018, https://arxiv.org/abs/1809.09395v1.

(Continued)

*Primary Examiner* — Tasnima Matin (57) ABSTRACT

Disclosed herein is an apparatus and method for a distributed memory object system. In one embodiment, a method includes forming a system cluster comprising a plurality of nodes, wherein each node includes a memory, a processor and a network interface to send and receive messages and data, electing a cluster manager to mediates cluster membership, node identification assignment, and a name service group, creating a node manager to initiate services for each of the plurality of nodes, wherein the node manager is configured to notify the cluster manager of its existence and node health, and creating a plurality of sharable memory spaces, wherein each space is a distributed memory object having an object owner node, and partitioning address space within each sharable memory space into chunks, wherein data may be placed in one or more memory regions mapped to the distributed memory object by either of a store call or a write call, and data stored in one or more memory regions mapped to the direct memory object may be accessed by a load call or a read call.

14 Claims, 5 Drawing Sheets

(52) U.S. Cl.
CPC .......... *G06F 3/067* (2013.01); *G06F 11/2094* (2013.01); *G06F 2201/82* (2013.01)

(58) Field of Classification Search
CPC ..... G06F 2212/1048; G06F 2212/1024; G06F 2212/152; G06F 3/06; G06F 9/54; G06F 12/08; G06F 16/10; H04L 67/10; H04L 67/1097
See application file for complete search history.

(56) References Cited

U.S. PATENT DOCUMENTS

| | | | |
|---|---|---|---|
| 7,328,319 B1* | 2/2008 | Bottomley | .......... G06F 11/2082 707/999.202 |
| 10,445,292 B1 | 10/2019 | Zhang et al. | |
| 10,511,484 B1 | 12/2019 | Yu et al. | |
| 2002/0103815 A1 | 8/2002 | Duvillier et al. | |
| 2006/0106832 A1 | 5/2006 | Ben-Dyke et al. | |
| 2009/0240664 A1 | 9/2009 | Dinker et al. | |
| 2013/0173853 A1 | 7/2013 | Ungureanu et al. | |
| 2013/0218840 A1 | 8/2013 | Smith et al. | |
| 2014/0012995 A1 | 1/2014 | Zhang | |
| 2015/0278397 A1 | 10/2015 | Hendrickson et al. | |
| 2016/0004480 A1 | 1/2016 | Lakshman | |
| 2016/0103845 A1 | 4/2016 | Yeddanapudi et al. | |
| 2016/0117254 A1 | 4/2016 | Susarla et al. | |
| 2016/0342341 A1 | 11/2016 | Voigt et al. | |
| 2016/0342542 A1 | 11/2016 | Voigt | |
| 2016/0364158 A1 | 12/2016 | Narayanan et al. | |
| 2017/0003899 A1 | 1/2017 | Raja et al. | |
| 2017/0123945 A1* | 5/2017 | Panasko | .................. G06F 3/067 |
| 2017/0168953 A1 | 6/2017 | Xu et al. | |
| 2017/0177222 A1 | 6/2017 | Singh et al. | |
| 2017/0212939 A1* | 7/2017 | Mukherjee | .......... G06F 16/2477 |
| 2017/0220777 A1 | 8/2017 | Wang et al. | |
| 2018/0074971 A1 | 3/2018 | Maxey et al. | |
| 2018/0136842 A1* | 5/2018 | Kim | ....................... G06F 3/0644 |
| 2018/0322058 A1 | 11/2018 | Tourrilhes et al. | |
| 2018/0343131 A1 | 11/2018 | George et al. | |
| 2019/0102287 A1 | 4/2019 | Cayton et al. | |
| 2020/0045010 A1 | 2/2020 | Sun et al. | |

OTHER PUBLICATIONS

Malinowski et al. "A Parallel MPI 1/0 Solution Supported by Byte-addressable Non-volatile RAM Distributed Cache," 2016, PTI Position Papers of the Federated Conference on Computer Science and Information Systems, vol. 9, pp. 133-140.

Shan et al., "Distributed Shared Persistent Memory," Sep. 2017, ACM SoCC '17, pp. 323-337.

Sundararaman et al., "Towards Software Defined Persistent Memory: Rethinking Software Support for Heterogenous Memory Architectures," Oct. 2015, ACM INFLOW'15.

Tsai et al., "Building Atomic, Crash-Consistent Data Stores with Disaggregated Persistent Memory," Jan. 2019, arXiv https://arxiv.org/abs/1901.01628v1.

* cited by examiner

DISTRIBUTED MEMORY OBJECT METHOD AND SYSTEM ENABLING MEMORY-SPEED DATA ACCESS IN A DISTRIBUTED ENVIRONMENT

CROSS-REFERENCE TO RELATED APPLICATION(S)

This application claims the benefit of and priority to U.S. Provisional Patent Application Ser. No. 62/713,537, filed on Aug. 2, 2018, for "Distributed Memory Object Architecture that Enables Memory-Speed Data Access for both Memory Semantics and Storage Semantics in a Distributed Environment", the entire disclosure of which are incorporated herein by references.

TECHNICAL FIELD

The present disclosure relates generally to distributed computing environments, and more particularly, to a distributed memory object architecture that enables memory-speed data access for both memory semantics and storage semantics in a distributed environment.

BACKGROUND

The computer industry continues to develop and refine solid-state storage devices and media, moving closer and closer to achieving memory-class storage. In the past decade there has been a thousand-fold reduction in access latency of affordable storage devices, and another twenty-fold reduction is expected within the year. At the same time, networking speeds have seen more than a 100-time increase in bandwidth with commensurate latency decrease, plus the emergence of standardized remote direct memory access (RDMA) functionality that can improve communication efficiency and further reduce latency.

These faster computing infrastructures demand new data infrastructures where both memory-speed data access and disk-like high storage density are strongly desired at the same time. Such new data infrastructures promise to bring significant performance improvements to computing tasks whose working data sets exceed dynamic random access memory (DRAM) capacity, and where highly frequent data movements between DRAM and lower storage tiers, such as solid state drive (SSD) and hard disk drive (HDD), are therefore required.

To provide the lowest possible access latency, operating system support of emerging persistent memory (Pmem) technology has created mechanisms for a user-space application to have direct access (DAX) to persistent memory media (i.e., without the access being performed by operating system software). Examples of existing solutions include:

"NOVA", which is a single-node file system for persistent memory with emphasis on consistency. It uses per-file metadatajournals for fast, concurrent, consistent updates. NOVA also supports DAX memory mapped access. It, however, does not provide cross-node replication or availability.

"Strata", which is a single-node file system that provides a tiered, log-structured file system starting from a persistent memory layer and progressing to SSD then HDD as the data access frequency cools. It, however, does not support DAX memory map access, nor provide cross-node replication or availability.

"Octopus", which is a multi-node distributed persistent memory file system using tightly integrated RDMA to reduce communication latency. It, however, does not support DAX memory mapped access.

"Hotpot", which is a multi-node kernel-level distributed shared persistent memory system that provides low latency, transparent memory accesses, data persistence, data reliability, and high availability. It is focused on memory mapped access and does not address standard file storage IO operations.

"FluidMem", which is a multi-node system that realizes disaggregated memory in the datacenter. It does not address memory persistence or storage IO.

None of these existing solutions, however, provide low-latency access of multi-node distributed data objects with both the semantics of memory and the semantics of file storage. It is therefore desirable to provide low-latency memory spaces: 1) that are accessible across a cluster of nodes, 2) that can exceed the memory capacity of a given node in the cluster, and 3) that can span the memory and storage of multiple nodes. It is further desirable that these memory spaces be accessible with either the load/store semantics of memory, or with the read/write, input/output semantics of file storage. Disclosed herein in a distributed memory object (DMO) system, referred to as MemVerge DMO system, that provides these types of low-latency memory spaces.

SUMMARY

Disclosed herein is an apparatus and method for distributed memory object. In one embodiment, a method includes forming a system cluster comprising a plurality of nodes, wherein each node includes a memory, a processor and a network interface to send and receive messages and data, electing a cluster manager to mediate cluster membership, node identification assignment, and a name service group; creating a node manager to initiate services for each of the plurality of nodes, wherein the node manager is configured to notify the cluster manager of its existence and node health; creating a plurality of sharable memory spaces, wherein each space is a distributed memory object having an object owner node; and partitioning address space within each sharable memory space into chunks, wherein data may be placed in one or more memory regions mapped to the distributed memory object by either of a store call or a write call, and data stored in one or more memory regions mapped to the direct memory object may be accessed by a load call or a read call. Other embodiments are explained within this disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

As used in the following description, remote direct memory access (RDMA) refers to a direct memory access mechanism that enables a computer to access the memory of another computer without involving the operating system of either computer. Persistent memory (Pmem) refers to the storage of data structures such that the data can continue to be accessed using memory instructions, e.g., load and store, even after completion of the process that created or modified the data structures.

A MemVerge direct memory object (DMO) system provides persistent distributed memory objects that can be accessed as either in-memory or file-storage mode, and may be implemented in low-latency RDMA. Thus, the MemVerge DMO system enables use of DMOs both as memory and storage. The MemVerge DMO system also allows data in the system to be converted between in-memory and file-storage modes. In general, embodiment MemVerge DMO systems provide close-to-memory-speed data access which in turn can significantly relive data bottlenecks observed at upper layer applications. Furthermore, embodiments may be built in user space, thus obviating the need to install a customized operating system kernel. We now turn to FIG. 1 to discuss an embodiment DMO system in more detail.

Figure 1:
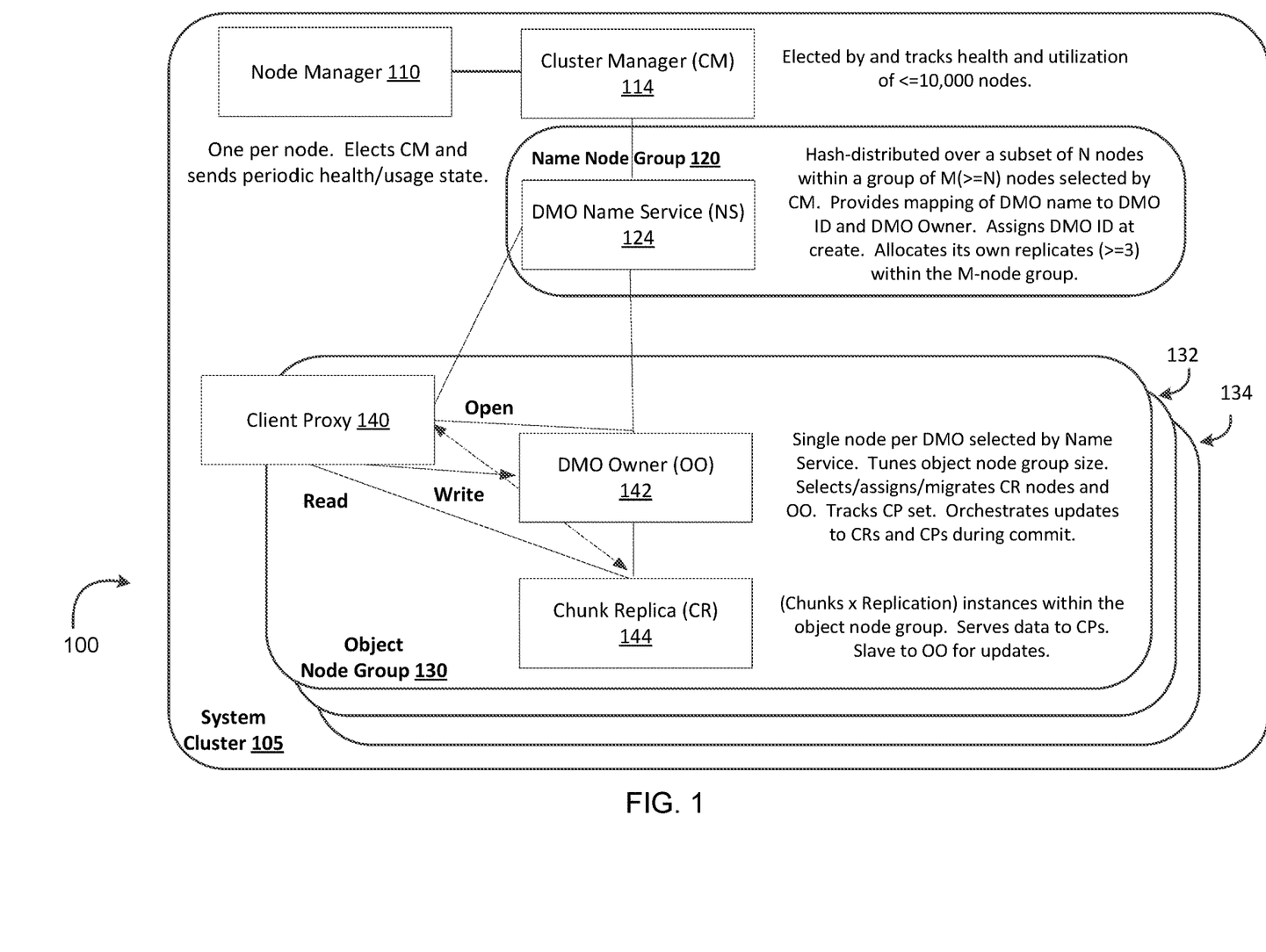
FIG. 1 is an illustration of a system cluster that includes an object node group that implements a distributed memory object (DMO) system, referred to herein a MemVerge DMO system, that provides persistent DMOs that can be accessed as either in-memory mode or file-storage mode.

FIG. 1 is an illustration of one embodiment of a MemVerge DMO system 100 that provides persistent distributed memory objects (DMOs) that can be accessed as either in-memory mode or file-storage mode. In DMO system 100, a system cluster 105 is formed by a number of nodes. Each node includes a memory, a processor and a network interface through which it may send and receive messages and data. The illustrated system 100 provides for the creation of sharable memory spaces, each space being a DMO with a single owner node such as object owner (OO) node 142. In this example a node that uses a DMO is referred to herein as a client proxy (CP) node. In the present embodiment, a system cluster 105 within which a MemVerge DMO system 100 may be implemented includes an object node group 130, a name node group 120, a node manager 110, and a cluster manager 114.

Address space for a DMO may be partitioned into equal size chunks, with each chunk being stored on one or more chunk replica (CR) nodes 144 included in the cluster of nodes 105. The chunks are distributed among a subset of the cluster nodes in such a manner as to: 1) focus locality of the chunks for performance efficiency, 2) provide sufficient availability of address space, and to 3) balance resources among the cluster of nodes. Furthermore, any node in a cluster using a DMO can locally keep a copy of a page.

The object owner node 142 is responsible for coordinating updates to the client proxy nodes 140 as well as the chunk replica nodes 144. The object owner node 142 is also responsible for maintaining a configurable replication factor per DMO. The object owner node 142 and chunk replica nodes 144 can migrate to deal with failures, performance, or resource constraints. Client proxy nodes 140 and chunk replica nodes 144 cooperate with the object owner node 142 in implementing protocols to make coherent updates and thereby provide a crash consistent view in the face of failures.

Various functional components of a DMO system are associated with one or more nodes in the system cluster and are described in the follow paragraphs.

Node Manager (NM)

A node manager (NM) 110 operates on each node in a MemVerge DMO system 100. Once a node manager 110 starts on a node, it can start or stop all other services associated with a node. Some services associated with a node may be started or stopped automatically or by request. The node manager 110 is responsible for finding or electing the cluster manager (CM) 114 and notifying its existence and node health to the cluster manager 114. Hence the node manager 110 has access to performance and exception information from other components in the system 100.

Cluster Manager (CM)

The cluster manager 114 runs on a single node in the MemVerge DMO system 100. The single node on which the cluster manager runs is elected by a consensus algorithm of the node managers. The cluster manager mediates cluster membership, node ID assignment, and the name service (NS) group 120. The cluster manager 114 also chooses nodes to satisfy allocation request constraints against cluster resource loading.

DMO Name Service (NS)

The DMO name service (NS) 124 is a hash-distributed service which provides mapping of a DMO name string to its object ID and the object owner. The service is hash distributed across a set of nodes in the system cluster 105. In the present example, the set of nodes is a name service group that is determined by the cluster manager.

Object Owner (OO)

The DMO object owner 142 is a single-node service that manages a DMO. The node corresponding to the client proxy 140 that creates the DMO becomes the object owner node 142. The object owner is responsible for selecting (via a cluster manager 114) an initial object node group 130 to contain the DMO and for assigning the chunk replicas (CRs) 144 within that node group. Some embodiments may contain additional object node groups 132, 134, etc. The object owner 142 also manages growing, shrinking, migrating, and recovering both the node group 130 as a whole, and the chunk replica 144 assignments within that group, as required to meet the DMO's size and replication requirement, or to optimize its usage efficiency. The object owner 142 can choose to move to another node (e.g., to be on the same node as a write client proxy). If the object owner 142 node fails, the DMO's node group will re-elect an object owner. The object owner keeps track of client proxies and orchestrates all updates affecting the DMO, e.g., configuration changes as well as data writes (msync commits and/or write IO).

Chunk Replica (CR)

The chunk replica 144 is a slave entity to the object owner 142 and client proxy 140. The object owner and client proxy read from and write to the chunk replica 144. The chunk replica owns some amount of storage devices (Pmem, SSD, etc.) on its node and manages the details of how/where a chunk of address space is stored therein.

Client Proxy (CP)

The client proxy 140 performs all input/output operations for the client and locally materializes and synchronizes/persists any object that the client requests to be memory mapped. To do that materialization, the client proxy creates a local cache for pieces of remote chunks that are in use and manages selection and eviction of pieces that are unused (or less actively used) as capacity constraints require. The client proxy 140 has code to specifically handle page fault notifications sent to it by the userfaultfd feature of Linux, or similar page fault notifications in other operating environments.

Example Operation Flows

Figure 2:
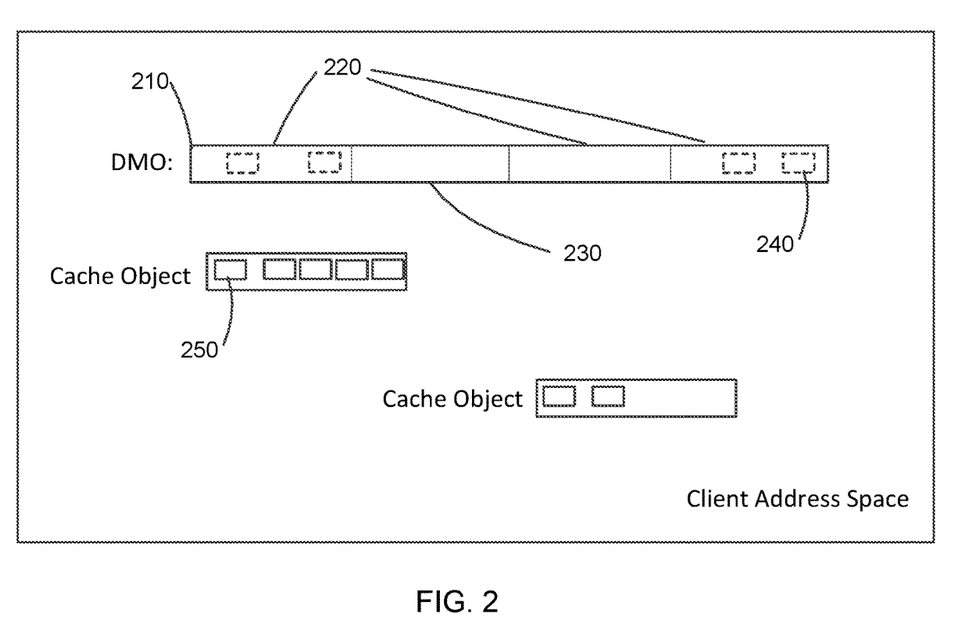
FIG. 2 is an illustration of a DMO in a client address space.

FIG. 2 is an illustration of a DMO in a client address space. When a client proxy opens a DMO, the client proxy allocates a logical address region 210 or space for that DMO and registers the region to monitor for page faults. The client proxy then direct maps for any local chunks 230 at their appropriate offset within the logical address region. Next, the client proxy acquires a remote direct memory access (RDMA) access descriptor to an instance of each remote chunk. The client proxy then creates and maps one or more persistent memory files to use as a cache 250. Now when the application accesses a region of that DMO space that is not direct mapped, a page fault is signaled and the client proxy's page fault handler will allocate an area of the cache file, fill the cache file via an RDMA read of the appropriate remote chunk area 220, and then map that area of the cache file into its appropriate offset of the DMO region, thus completing the handling of the page fault.

Note that management of the cache capacity may require that a previously allocated area of cache be removed from its current role in the DMO address space (i.e., evicted) in order to reassign it for a new role. This eviction process can typically happen as a background task where an eviction candidate is selected, unmapped from the DMO space, and written back via an RDMA write to its remote location if required. The cache area of that candidate is then freed for reallocation.

With continued reference to FIG. 2 and additional reference to FIG. 1, a client application installed in a client node or local node, which may be any node in the system cluster of FIG. 1, opens a DMO name. For example, the client application may "call" MemVerge library that is included in the client application and may "call" a client proxy. The MemVerge library is configured to map an anonymous memory region equal to the size of the DMO, to register that memory region for user page faults, to over map 240 the local chunk files on that memory region, and to remember the cache file for later use. The client proxy is configured to call the DMO name service to get the object owner, call the object owner to get table of chunk nodes, to open "local chunk" files that are on the local node, to open an empty "cache file" or "cache object" on the local node, and to reply to MemVerge library in the local node with file information including: a file descriptor for the local chunk files on the local node and a file descriptor for the cache file/object. The file descriptor for the local chunks may include an offset within the logical address space for the DMO and a size for the local chunk.

The client application starts using the DMO, i.e., it can do load/store references to the DMO, and/or read/write input/output calls to/from the DMO. If a load/store reference from the client application accesses a DMO region that is not over mapped, the client application takes/receives a page fault.

The MemVerge library gets a page fault notification and calls to the client proxy. The client proxy caches the needed region into the cache file and replies to the MemVerge library. The MemVerge library then can over map the new region onto an appropriate local DMO space.

Thus, from a client application perspective, a MemVerge DMO system 100 enables a user, via the client application in conjunction with a client proxy, to initiate the use of a DMO, have data placed in one or more memory regions mapped to the DMO by either of a store call or a write call, and access data stored in one or more memory regions mapped to the DMO by a load call or a read call. We now turn to FIG. 5 to illustrate memory modes, and in particular a DMO memory mode 520, storage mode core 510 APIs and mode conversion APIs in more detail.

Data Accessing Modes of DMO Objects

A DMO object can be accessed in one of the two modes, namely, storage mode and memory mode. In general, storage mode allows a user to perform conventional file and object operations on DMO objects. Such operations include open, read, write, close, memory map operations and directory operations, etc. A DMO object in storage mode can be replicated for high availability. Memory mode however allows user to access data using memory semantics such as memory allocation, deallocation and accessing data using pointer semantics. Therefore, reading from and writing to memory mode objects are achieved via memory load and store semantics.

Storage Mode

Figure 5:
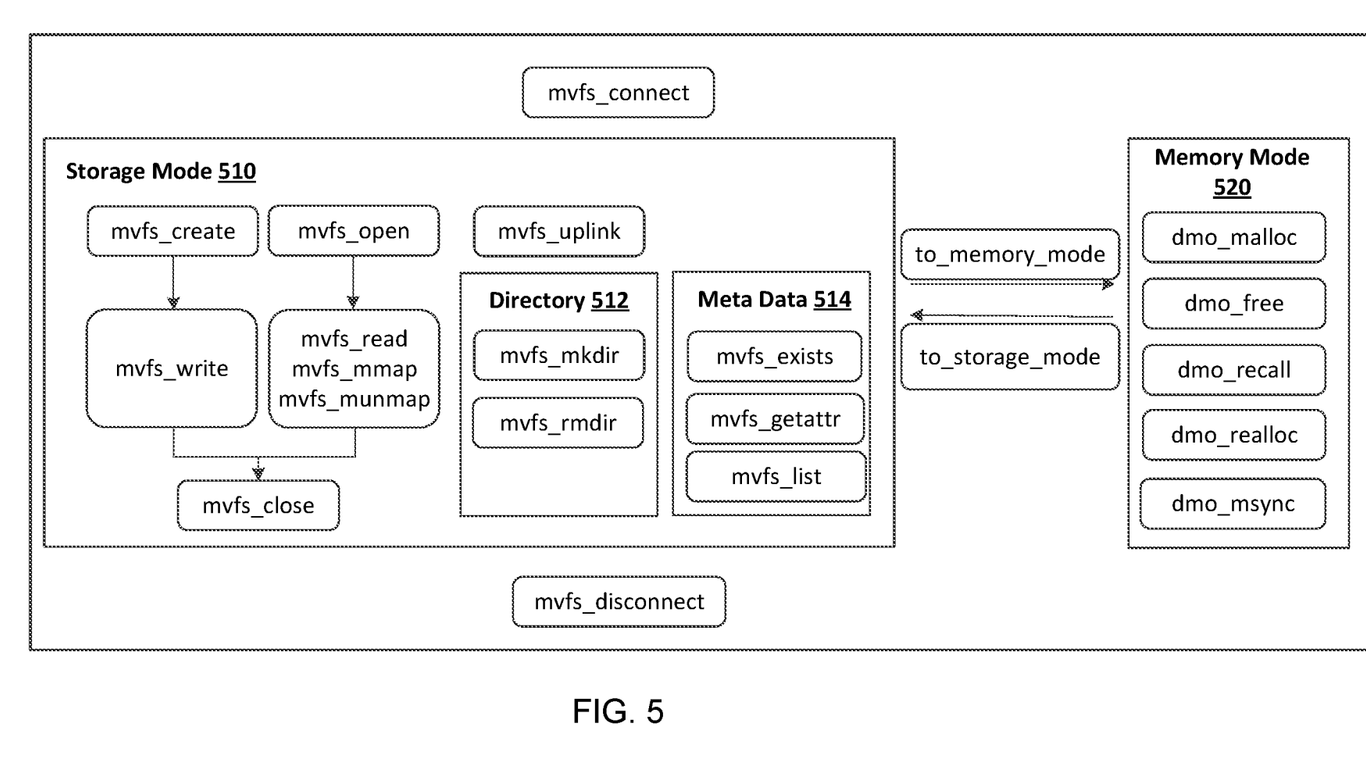
FIG. 5 is an illustration of DMO memory mode, storage mode core APIs and mode conversion APIs.

Storage mode 610 is designed for "write-once, read many times" objects. The core storage mode APIs are shown in the left side of FIG. 6. A storage mode object can be created by A user with the function mvfs_create. A user can then write data with mvfs_write, and close it with mvfs_close. After an object is closed, the object cannot be rewritten. To read data from a storage mode object, it is first opened with mvfs_open, then data is read using an mvfs_read API. A DMO object could be removed with mvfs_unlink. User can also map a DMO storage object into its virtual memory address using the function mvfs_mmap, and read data through a memory copy. Note that as DMO objects in storage mode are write-once, the resulting mapped addresses are read-only.

A storage mode DMO object 610 can be replicated to different cluster nodes to increase availability. This is done by passing a replication policy for the object when the function mvfs_create is called by a user. Additionally, storage mode APIs further allow users to create objects under directories.

Memory Mode

The core APIs of memory mode 620 are listed in the right side of FIG. 6. These APIs allows creating and destroying DMO objects via memory allocation and deallocation operations, respectively. In this embodiment, read and write operations are done through memory copy realized by CPU load and store instructions.

A new memory mode object may be created by allocating it from DMO with the function dmo_malloc. This function returns a pointer to the first byte of a newly allocated DMO memory object, upon a successful operation. A user can then start writing and reading data by performing memory copy operations to and from the memory address range of the object.

An allocated memory object can be destroyed with the function dmo_free. The allocated memory space will then be reclaimed by DMO. The function dmo_msync may be called after writing data via memory copy to make sure data are fully written into persistent memory (as data may also partially stay in CPU cache).

DMO supports both volatile memory mode object as well as persistent memory mode object. One way to implement these two kinds of memory mode objects is to include an additional input parameter for the dmo_malloc function. The parameter can be a string, representing the name of the memory object to be allocated. When the input name is empty, the DMO generates an internal unique name and allocates a volatile memory object. In turn, a volatile memory object is destroyed when user deallocates the object or disconnects from a DMO. A volatile memory object will also be destroyed after DMO itself reboots. When input name passed to dmo_malloc is non-empty, a persistent memory mode object will be allocated. Since volatile memory object does not have a user-given name and therefore cannot be described, other processes cannot access it.

As opposed to a volatile memory mode object, a persistent memory mode object survives across user disconnection and DMO reboot. As long as the object is not deallocated, a persistent memory object can be retrieved using a dmo_recall function by passing in the name of the object. The function dmo_recall then looks up the object in DMO. Upon success, it returns the pointer to the first byte of the allocated persistent memory mode object. A user can then use the returned pointer to continue data access. As persistent memory mode has a user-given name, the object can be accessed from all the DMO nodes.

Memory mode APIs provide a user data access experience that is close to conventional local memory access. (i.e., data locality, low latency, pointer semantics). Therefore, a memory mode DMO object can always be rewritten. However, storage features such as replication and directory support are not available for such objects for performance and usability considerations.

Mode Conversions

DMO further allows mode conversion for its objects. A persistent memory mode object can be converted to a storage mode object using the to_storage_mode API. A user can further pass in a parameter that specifies the replication policy. In this case, the DMO will switch the object to storage mode, and start replicating the object across nodes following the specified replication policy. After conversion, the object can only be accessed using storage mode API, becoming read-only. Similarly, a storage mode object can be converted to a persistent memory mode object using the to_memory_mode API. In doing so, all the replicas of the object will be invalidated, becoming point-in-time snapshots. Upon success, the function returns a pointer pointing to the first byte of the converted memory object. After the conversion, the object becomes writeable and only memory mode APIs can be used for accessing the object's data. Replication support will no longer be available to the object.

Implementation Alternatives

To implement larger memory space than physically available on a node, some form of demand paging is necessary. Three implementation approaches are presented: user space, kernel, and hypervisor.

Figure 3:
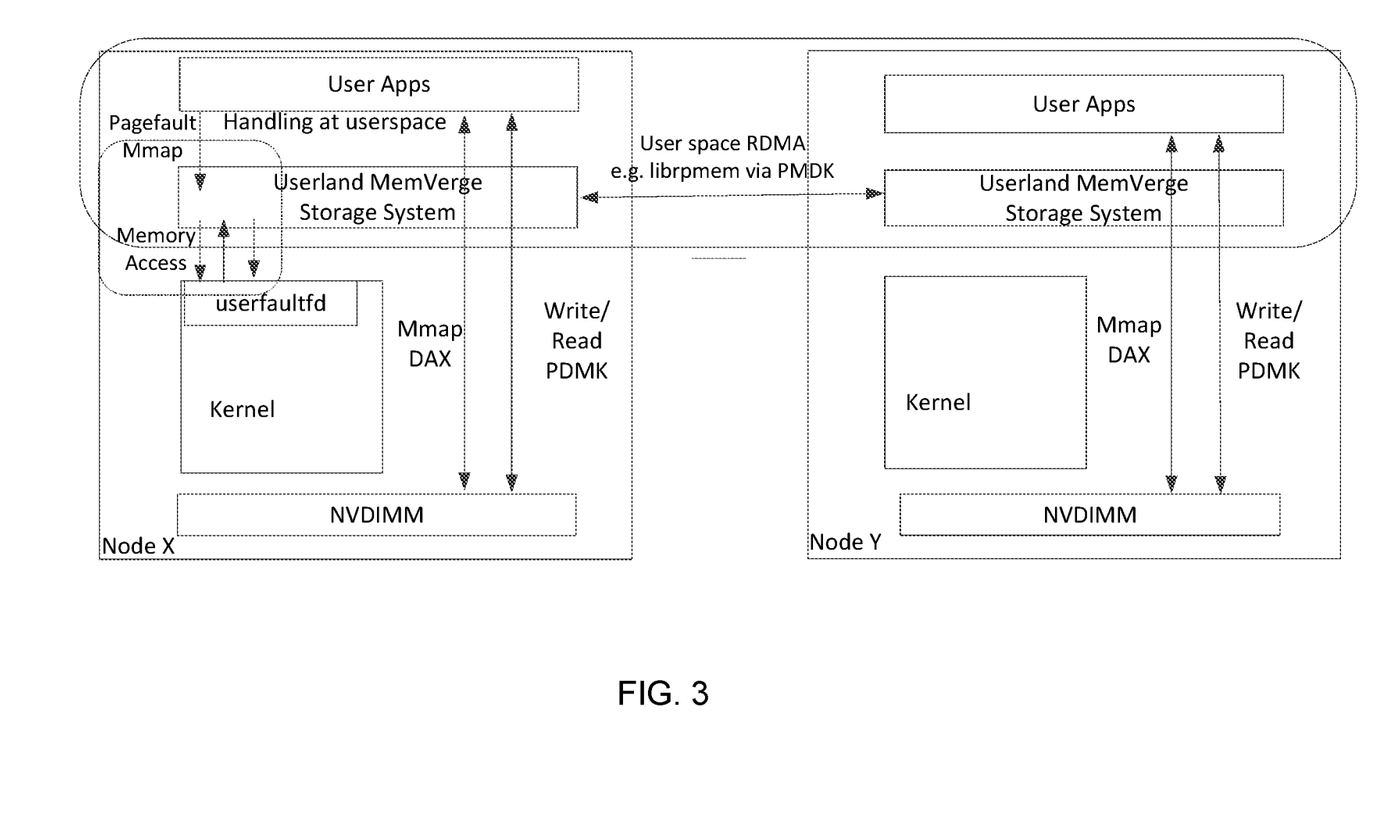
FIG. 3 is an illustration of components and processes of implementing a larger memory space across nodes by a user space approach.

FIG. 3 is an illustration of components and processes of implementing a larger memory space across nodes by a user space approach. The user space approach uses the Linux userfaultfd mechanism to monitor the logical address space of the client and provide notification whenever access to a non-resident page of the object is attempted. Since a user space process cannot directly control physical memory mapping, it uses a direct access (DAX) file system to indirectly affect this. The data for the faulting area is copied to a local file and that file is mapped into the client's address space, thus materializing the data for the page fault. This mechanism is the least intrusive to the operating environment in that it does not require a new operating system. A user space approach may provide fast development, which in turn may be beneficial to both prototype and product developments. Furthermore, a user space approach may facilitate experiments with different new technologies invented for user space apps. Additionally, a user space approach may be easy to deploy, easy to containerize, and may easily connect to other user space storage frameworks such as SPDK. However, it may utilize indirect access to memory map.

In some embodiments, a kernel space approach uses the kernel memory management to intercept page faults from the client process. As a kernel entity, the page fault handler can directly manipulate the address map. The handler can maintain a memory pool where it caches a copy of the required data, and then directly map it into the client's address space. A kernel space approach can provide a fast, efficient access to memory map; however, it also could use a custom OS and may increase scope of testing (re-verify OS).

Figure 4:
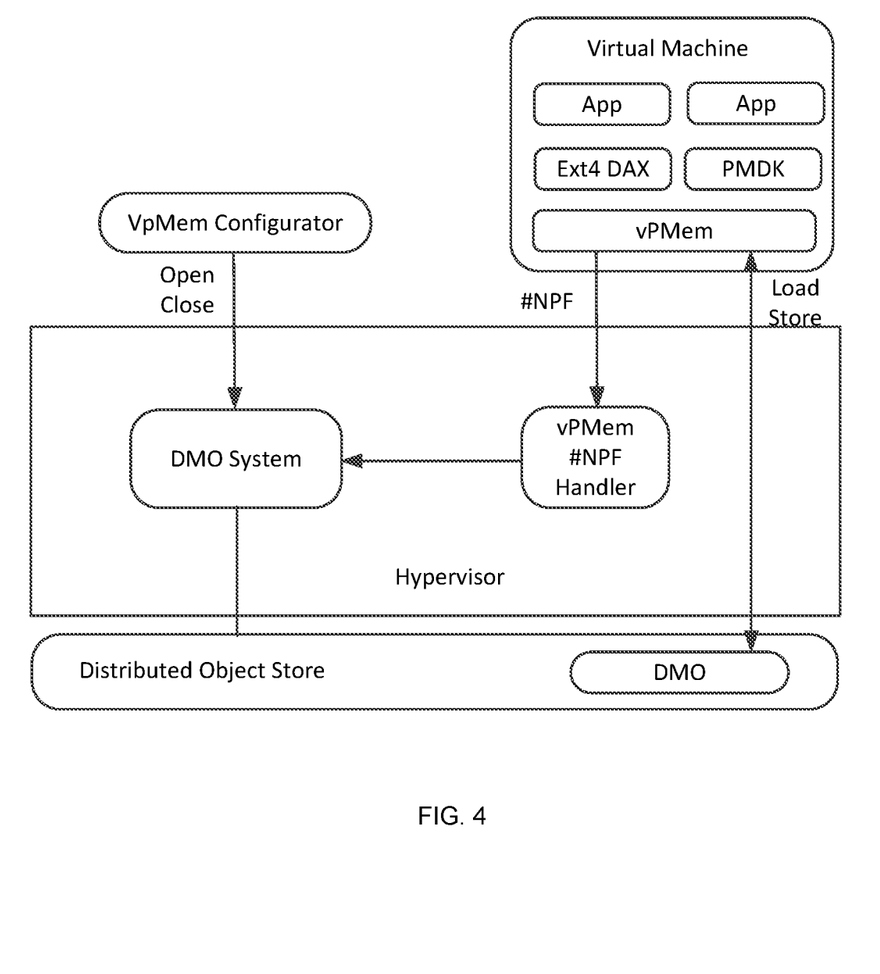
FIG. 4 is an illustration of components and processes of implementing a larger memory space across nodes by a hypervisor approach.

FIG. 4 is an illustration of components and processes of implementing a larger memory space across nodes by a hypervisor approach. In the hypervisor approach, one or more virtual PMEM (vPMem) devices is presented to the host operating system. Each vPMem is a logical address space within the hypervisor address map that gets presented to the host operating system as its physical address space. The hypervisor's memory manager intercepts the page faults to that space to materialize the assigned object's data. Analogous to the OS kernel, a hypervisor has direct access to its map. The page fault handler can therefore maintain a memory pool in which it caches required data, and then map that data into the host OS's address space to service a page fault. Note that the page fault can be from a user application in the host OS, or from a host OS component, etc. This approach can provide a fast, efficient access to memory map, and does not require a custom operating system.

While various embodiments of the invention have been described above, they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, the various features and functionality described in one or more of the individual embodiments are not limited in their applicability to the particular embodiment with which they are described. They instead can be applied alone or in some combination, to one or more of the other embodiments of the disclosure, whether or not such embodiments are described, and if such features are presented as being a part of a described embodiment. Thus, the breadth and scope of the present disclosure should not be limited by any of the above-described exemplary embodiments.

In this document, the terms "module" and "engine" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A distributed memory object method, the method comprising:
   forming a system cluster comprising a plurality of nodes, wherein each node includes a memory, a processor and a network interface to send and receive messages and data;
   electing a cluster manager to mediate cluster membership, node identification assignment, and a name service group, wherein the cluster manager selects the nodes to satisfy a plurality of allocation request constraints against a cluster resource loading, wherein the name service group is hash distributed across the nodes in the system cluster;
   creating a node manager to initiate services for each of the plurality of nodes, wherein the node manager is configured to notify the cluster manager of its existence and node health; and
   creating a plurality of sharable memory spaces, wherein each space is a distributed memory object having an object owner node, and then partitioning address space within each sharable memory space into chunks, wherein data may be placed in one or more memory regions mapped to the distributed memory object by either of a store call or a write call, and data stored in one or more memory regions mapped to the direct memory object may be accessed by a load call or a read call, wherein the address space for a distributed memory object is partitioned into equal size chunks, with each chunk being stored on one or more chunk replica nodes included in the plurality of nodes, wherein the distributed memory object (DMO) is accessed in one of the two modes comprising: a storage mode and a memory mode, wherein the storage mode allows a user to perform conventional file and object operations on the DMO object, wherein the memory mode allows the user to access data b utilizing memory semantics, wherein the DMO supports a volatile memory mode object and a persistent memory mode object.

2. The distributed memory object method of claim 1, wherein the chunks are further distributed among a subset of the cluster nodes in such a manner as to focus locality of the chunks for performance efficiency, provide sufficient availability of address space, and to balance resources among the system cluster.

3. The distributed memory object method of claim 1, wherein the cluster manager is elected by consensus algorithm of node managers.

4. The distributed memory object method of claim 1, wherein any node in the cluster that is using a distributed memory object can keep a copy of a page of data from within the cluster.

5. The distributed memory object method of claim 1, further comprising at least one client proxy node to perform input and output operations, wherein the object owner node is responsible for coordinating updates to the client proxy node and to chunk replica nodes.

6. The distributed memory object method of claim 5, wherein the object owner node and chunk replica nodes can migrate to deal with failures, performance, or resource constraints.

7. The distributed memory object method of claim 6 further comprising a plurality of client proxy nodes, wherein the client proxy nodes and chunk replica nodes cooperate with the object owner node in implementing protocols to make coherent updates and thereby provide a crash consistent view in the face of failures.

8. A distributed memory object system, comprising:
a system cluster having a plurality of nodes, wherein each node includes a memory, processor and a network interface to send and receive messages and data;
a cluster manager configured to mediate cluster membership, node identification assignment, and a name service group, wherein the cluster manager selects the nodes to satisfy a plurality of allocation request constraints against a cluster resource loading, wherein the name service group is hash distributed across the nodes in the system cluster;
a node manager to initiate services for each of the plurality of nodes, wherein the node manager is configured to notify the cluster manager of its existence and node health; and
a plurality of sharable memory spaces, wherein each space is a distributed memory object having an object owner node, and then partitioning address space within each sharable memory space into chunks, wherein data may be placed in one or more memory regions mapped to the distributed memory object by either of a store call or a write call, and data stored in one or more memory regions mapped to the direct memory object may be accessed by a load call or a read call, wherein the address space for a distributed memory object is partitioned into equal size chunks, with each chunk being stored on one or more chunk replica nodes included in the plurality of nodes, wherein the distributed memory object (DMO) is accessed in one of the two modes comprising: a storage mode and a memory mode, wherein the storage mode allows a user to perform conventional file and object operations on the DMO object, wherein the memory mode allows the user to access data by utilizing memory semantics, wherein the DMO supports a volatile memory mode object and a persistent memory mode object.

9. The distributed memory object system of claim 8, wherein the chunks are further distributed among a subset of the cluster nodes in such a manner as to focus locality of the chunks for performance efficiency, provide sufficient availability of address space, and to balance resources among the system cluster.

10. The distributed memory object system of claim 8, wherein the cluster manager is elected by consensus algorithm of node managers.

11. The distributed memory object system of claim 8, wherein any node in the cluster that is using a distributed memory object can keep a copy of a page of data from within the cluster.

12. The distributed memory abject system of claim 8, further comprising at least one client proxy node to perform input and output operations, wherein the object owner node is responsible for coordinating updates to the client proxy node and to chunk replica nodes.

13. The distributed memory object system of claim 12, wherein the object owner node and chunk replica nodes can migrate to deal with failures, performance, or resource constraints.

14. The distributed memory object method of claim 13 further comprising a plurality of client proxy nodes, wherein the client proxy nodes and chunk replica nodes cooperate with the object owner node in implementing protocols to make coherent updates and thereby provide a crash consistent view in the face of failures.

* * * * *